United States Patent
Urakami et al.

(10) Patent No.: US 9,406,316 B2
(45) Date of Patent: Aug. 2, 2016

(54) ASYMMETRIC MAMR HEAD WITH SELF-ALIGNED SPIN TORQUE OSCILLATOR ALONG FLARE EDGE FOR SHINGLED MAGNETIC RECORDING

(71) Applicant: HGST Netherlands B.V., Amsterdam (NL)

(72) Inventors: Yosuke Urakami, Odawara (JP); Masato Shiimoto, Odawara (JP); Kazue Kudo, Odawara (JP); Hiromi Shiina, Hitachi (JP)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/278,969

(22) Filed: May 15, 2014

(65) Prior Publication Data
US 2015/0332711 A1     Nov. 19, 2015

(51) Int. Cl.
| G11B 5/31 | (2006.01) |
|---|---|
| G11B 5/23 | (2006.01) |
| G11B 5/127 | (2006.01) |
| G11B 5/00 | (2006.01) |

(52) U.S. Cl.
CPC ............... *G11B 5/1278* (2013.01); *G11B 5/23* (2013.01); *G11B 5/315* (2013.01); *G11B 5/3133* (2013.01); *G11B 2005/0024* (2013.01)

(58) Field of Classification Search
CPC .............................................. G11B 2005/0024
See application file for complete search history.

(56) References Cited

U.S. PATENT DOCUMENTS

| 8,223,458 | B2* | 7/2012 | Mochizuki et al. .. | G11B 5/1278 360/125.1 |
|---|---|---|---|---|
| 8,305,711 | B2 | 11/2012 | Li et al. | |
| 8,320,079 | B2 | 11/2012 | Iwasaki et al. | |
| 8,339,734 | B2* | 12/2012 | Pentek et al. ........ | G11B 5/1278 360/119.03 |
| 8,472,135 | B1 | 6/2013 | Kusukawa et al. | |
| 8,477,453 | B2 | 7/2013 | Takano et al. | |
| 8,520,338 | B2 | 8/2013 | Udo et al. | |
| 8,547,661 | B2 | 10/2013 | Bai | |
| 8,547,662 | B2 | 10/2013 | Yamada et al. | |
| 8,553,507 | B1 | 10/2013 | Tagawa et al. | |
| 8,705,206 | B1* | 4/2014 | Maeda et al. ........ | G11B 5/3146 360/119.04 |
| 8,964,332 | B1* | 2/2015 | Katada et al. .......... | G11B 5/314 360/125.3 |

(Continued)

OTHER PUBLICATIONS

Zhu, Jian-Gang; et al.; "Microwave Assisted Magnetic Recording Utilizing Perpendicular Spin Torque Oscillator With Switchable Perpendicular Electrodes", IEEE Transaction on Magnetics, vol. 46, No. 3, Mar. 2010; 7 pages.

*Primary Examiner* — Craig A. Renner
(74) *Attorney, Agent, or Firm* — Patterson & Sheridan, LLP

(57) ABSTRACT

The present disclosure generally relates to the structure of a perpendicular magnetic write head for use in a magnetic disk drive. A shingled-microwave-assisted magnetic recording head for use in a high-areal-density hard disk drive comprises a trailing shield, a flare-shaped main pole, one or more side shields, a spin torque oscillator, and two asymmetric side gaps, where one side gap has a smaller width than the other side gap. The spin torque oscillator shares a first continuous edge with the main pole on a side adjacent the side gap having the smaller width and shares a second continuous edge adjacent a media facing surface. The angle of the spin torque oscillator and the main pole formed by the media facing surface and the narrow side gap is greater than about 90°.

20 Claims, 10 Drawing Sheets

(56) References Cited

U.S. PATENT DOCUMENTS

| | | | | |
|---|---|---|---|---|
| 2011/0090603 A1* | 4/2011 | Bai | G11B 5/3153 | 360/319 |
| 2012/0275061 A1* | 11/2012 | Takagishi et al. | G11B 5/3146 | 360/123.05 |
| 2013/0028058 A1* | 1/2013 | Yasui et al. | G11B 5/1278 | 369/13.14 |
| 2013/0250456 A1* | 9/2013 | Yamada et al. | G11B 5/1278 | 360/125.03 |
| 2014/0177105 A1* | 6/2014 | Shiimoto et al. | G11B 5/105 | 360/125.01 |
| 2015/0015992 A1* | 1/2015 | Funayama | G11B 5/1278 | 360/119.04 |
| 2015/0092301 A1* | 4/2015 | Fujita et al. | G11B 5/3146 | 360/123.05 |

\* cited by examiner

ASYMMETRIC MAMR HEAD WITH SELF-ALIGNED SPIN TORQUE OSCILLATOR ALONG FLARE EDGE FOR SHINGLED MAGNETIC RECORDING

BACKGROUND OF THE INVENTION

1. Field of the Invention

Embodiments disclosed herein generally relate to the structure of a perpendicular magnetic write head for use in a magnetic disk drive.

2. Description of the Related Art

Over the past few years, shingled magnetic recording (SMR) has been studied as a recording technique for improving the areal density. FIG. 1 shows a diagram 100 of one example of the SMR technique. In this technique, multiple tracks 103 overlap and are written in a shingle pattern. A partial view of a magnetic recording head 105 is shown and the magnetic recording head 105 moves over the tracks 103 in the direction of the arrow 107, while progressive scans are in the direction of the arrow 111. Magnetic flux is applied to the magnetic recording head 105 in the direction of the arrow 109. With the SMR technique, an actual read track is written by using the end of the main pole, and thus, the write characteristics in the end of the main pole are important. Specifically, the magnetic field gradient in the cross-track direction and the magnetic field gradient in the down-track direction at the track edge must be improved.

Previously, for improving the write characteristics at the track edge, increasing the magnetic field gradient was attempted by reducing two side gaps 204 on either side of a main pole 202, as shown in FIG. 2. Comparing the first magnetic head 200 to the second magnetic head 201 in FIG. 2, magnetic head 200 has significantly wider side gaps 204 than magnetic head 201. However, by only narrowing the side gaps 204 in magnetic head 201, the problem of the absorption of the magnetic field into the side shields 208 and inadequate strength arose, and consequently, the inability to obtain the desired magnetic field gradient.

In addition, over the past few years, microwave-assisted magnetic recording (MAMR) has been studied as a technique for effectively improving the write magnetic field strength. In MAMR, the effective write magnetic field gradient can be increased by an alternating current (AC) magnetic field generated by a spin torque oscillator (STO). The STO is composed of a field generation layer (FGL) for generating the AC magnetic field, a spacer layer (spacer), and a spin polarization layer (SPL) for transmitting the spin polarized torque, and is typically placed in the center of the main pole on the trailing shield side of the main pole. By applying the magnetic field from the writer to the STO and conducting current to the STO, the STO oscillates, and the AC magnetic field is applied to the medium.

It is possible to combine the SMR and MAMR techniques. However, in a narrow track high-areal-density hard disk drive (HDD), the maximum MAMR assist effect must be implemented at the track edge in order to achieve a high signal-to-noise ratio (SNR), and the cross track gradient and down track gradient at the track edge must be increased. By only placing the STO in the center of the main pole on the trailing shield side of the main pole, the magnetic field gradient at the track edge could not be increased, and adequate gain could not be obtained by the MAMR-SMR technique.

FIGS. 3A-3B show a magnetic recording head 300 with an STO 306 having a conventional rectangular shape. FIG. 3A shows the magnetic head 300 viewed from the surface of a media facing surface (MFS) such as an air-bearing surface (ABS). The magnetic head 300 includes a trailing shield 312. FIG. 3B shows a cross-sectional at the contact surface between the main pole 302 and the STO 306 of the recording head 300. With this recording head 300, the side gap 304, which is located next to the STO 306, has been reduced in size while the side gap 314 has not. However, the narrower side gap 304 must be widened to insulate the side shield 308 and the STO 306. This results in the degradation of the cross track gradient of the write magnetic field. As a result of the degradation of the AC magnetic field gradient strength in magnetic head 300, the SNR does not improve because the conduction region 416 to the STO 306 has decreased, as shown in FIG. 4.

Therefore, there is a need in the art for a perpendicular magnetic write head having improved SNR.

SUMMARY OF THE INVENTION

The present disclosure generally relates to the structure of a perpendicular magnetic write head for use in a magnetic disk drive. A shingled-microwave-assisted magnetic recording head for use in a high-areal-density hard disk drive comprises a trailing shield, a flare-shaped main pole, one or more side shields, a spin torque oscillator, and two asymmetric side gaps, where one side gap has a smaller width than the other side gap. The spin torque oscillator shares a first continuous edge with the main pole on a side adjacent the side gap having the smaller width and shares a second continuous edge adjacent a media facing surface. The angle of the spin torque oscillator and the main pole formed by the media facing surface and the narrow side gap is greater than about 90°.

In one embodiment, a magnetic media device comprises a shingled-microwave-assisted magnetic recording head. The recording head includes a main pole, one or more side shields, a trailing shield coupled to the one or more side shields, and two asymmetric side gaps located on either side of the main pole between the one or more side shields, where one side gap has a smaller width than the other side gap. A spin torque oscillator is disposed on the main pole, where the spin torque oscillator shares a first continuous edge with the main pole on a side adjacent the side gap having the smaller width and shares a second continuous edge adjacent a media facing surface.

In another embodiment, a magnetic media device comprises a shingled-microwave-assisted magnetic recording head, a main pole, a trailing shield, a side shield adjacent the main pole and a narrow side gap located on one side of the main pole between the side shield. A spin torque oscillator is disposed on the main pole, where the spin torque oscillator shares a first continuous edge with the main pole on a side adjacent the narrow side gap and shares a second continuous edge adjacent a media facing surface.

In another embodiment, a hard disk drive comprises one or more magnetic disks, an actuator, one or more actuator arms associated with each of the one or more magnetic disks, a spindle motor, a shingled-microwave-assisted magnetic recording head, a main pole, one or more side shields adjacent to the main pole, a trailing shield coupled to the one or more side shields, and two asymmetric side gaps located on either side of the main pole between the one or more side shields, where one side gap has a smaller width than the other side gap. A non-rectangular spin torque oscillator is disposed on the main pole, where the spin torque oscillator shares a first continuous edge with the main pole on a side adjacent the side gap having the smaller width and shares a second continuous edge adjacent a media facing surface.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to exemplified embodiments. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present disclosure generally relates to the structure of a perpendicular magnetic write head for use in a magnetic disk drive. A shingled-microwave-assisted magnetic recording head for use in a high-areal-density hard disk drive comprises a trailing shield, a flare-shaped main pole, one or more side shields, a spin torque oscillator, and two asymmetric side gaps, where one side gap has a smaller width than the other side gap. The spin torque oscillator shares a first continuous edge with the main pole on a side adjacent the side gap having the smaller width and shares a second continuous edge adjacent a media facing surface. The angle of the spin torque oscillator and the main pole formed by the media facing surface and the narrow side gap is greater than about 90°.

Figure 5A:
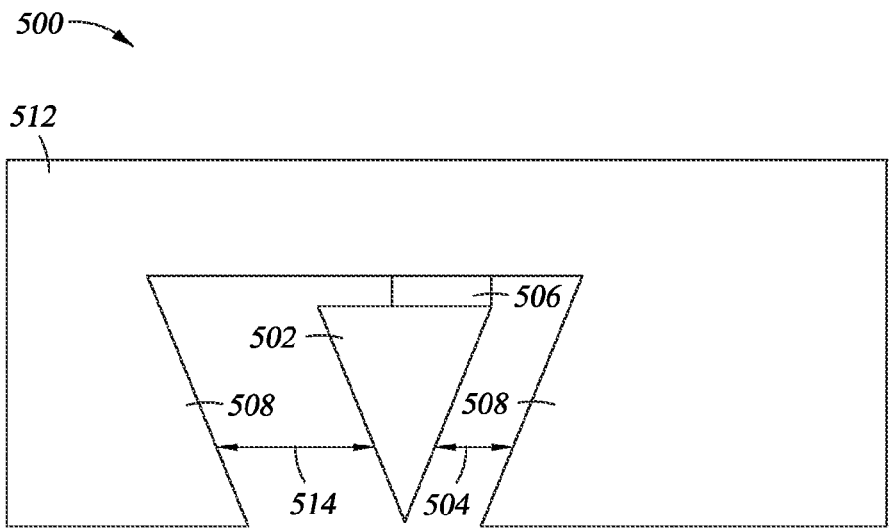
FIGS. 5A-5B illustrate shingled-microwave-assisted magnetic recording head according to one embodiment.
Figure 5B:
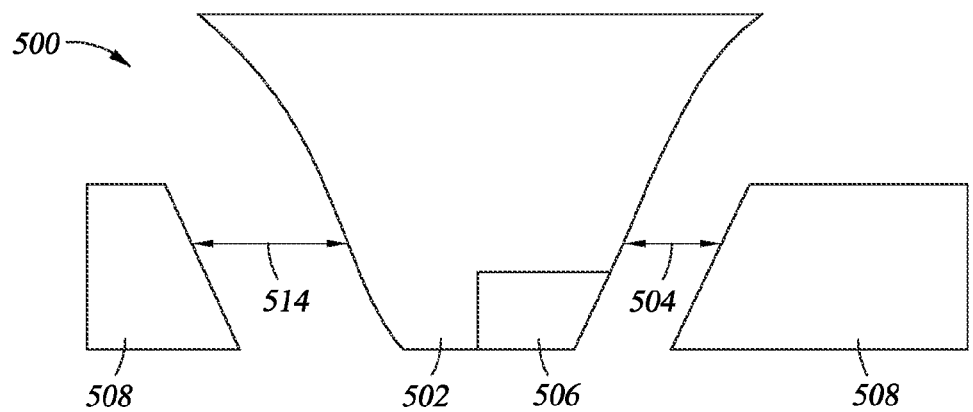

A high-areal-density HDD is implemented by SMR using MAMR to provide a perpendicular magnetic write head structure having a high SNR. FIGS. 5A-5B illustrate the shingled-microwave-assisted magnetic recording (MAMR-SMR) head 500, according to one embodiment. FIG. 5A shows the MAMR-SMR head 500 viewed from the surface of the MFS. FIG. 5B shows a cross-sectional at the contact surface between the flare-shaped main pole 502 and the non-rectangular STO 506 of the MAMR-SMR head 500. The side of the non-rectangular STO 506 adjacent the ABS has a width less than the side of the STO 506 opposite the ABS. The STO 506 may be composed of several layers not shown in the figures, including a FGL for generating the AC magnetic field, a spacer, and a SPL for transmitting the spin polarized torque.

Figure 1:
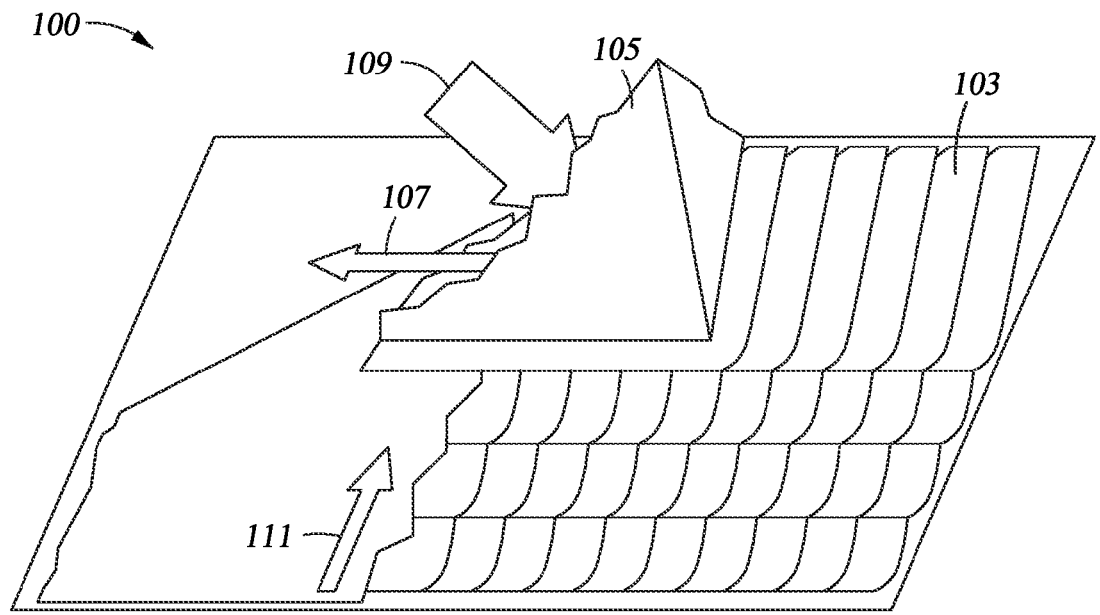
FIG. 1 is a diagram illustrating shingled magnetic recording.
Figure 2:
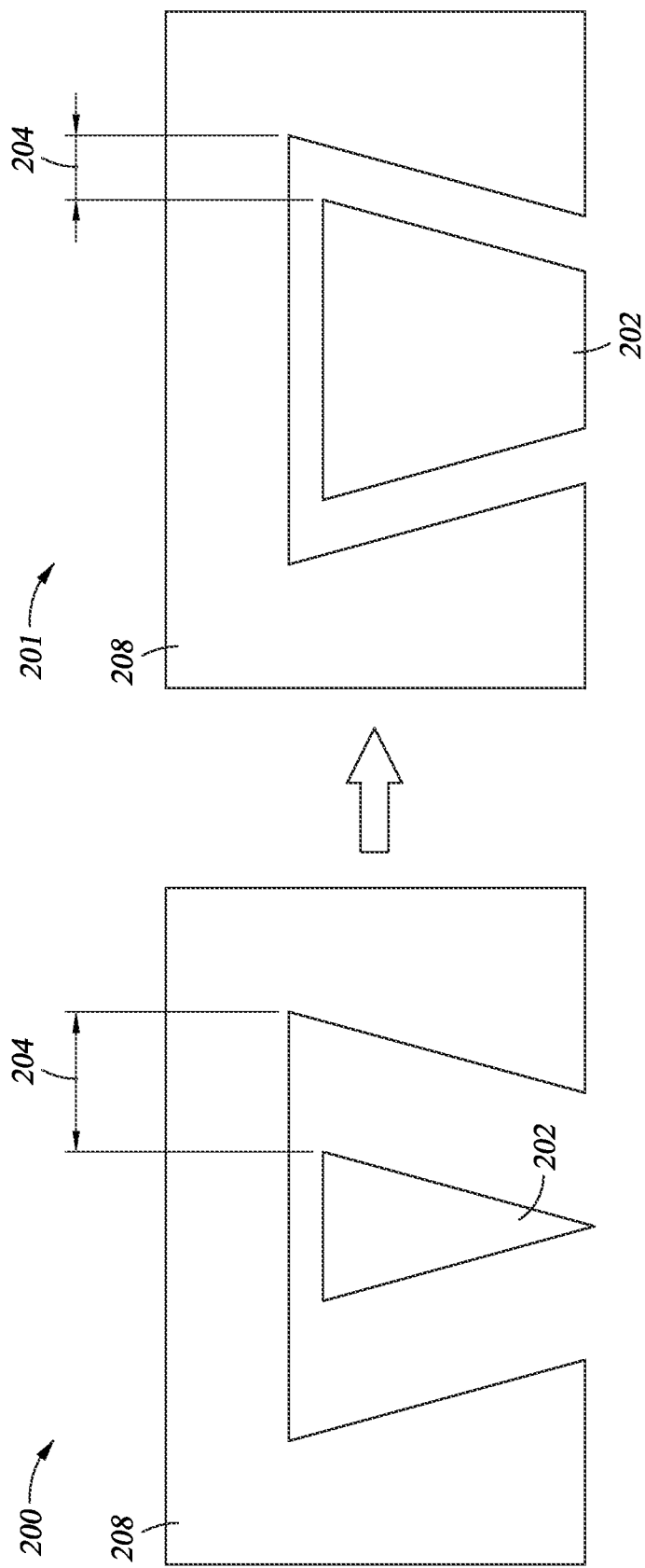
FIG. 2 illustrates side gap reduction for higher cross track gradient.
Figure 3A:
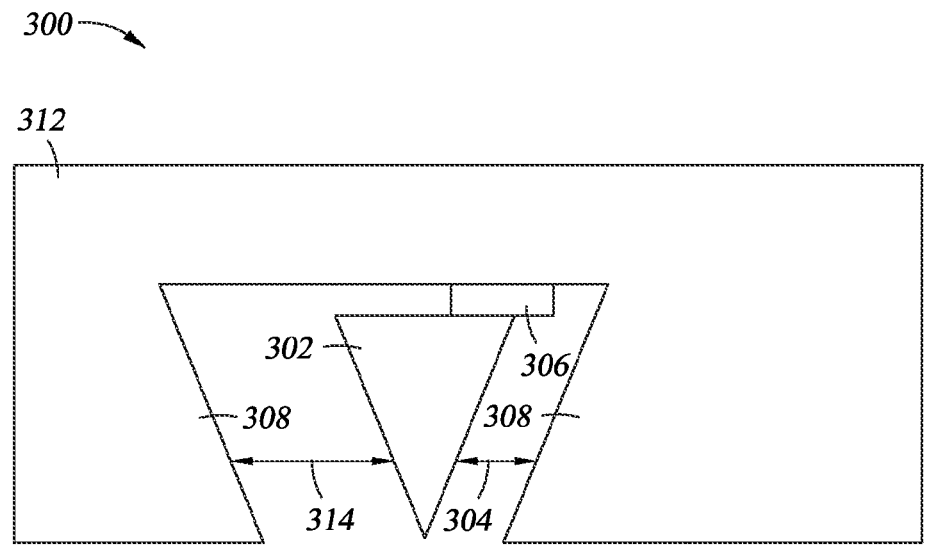
FIGS. 3A-3B illustrate a conventional magnetic head.
Figure 3B:
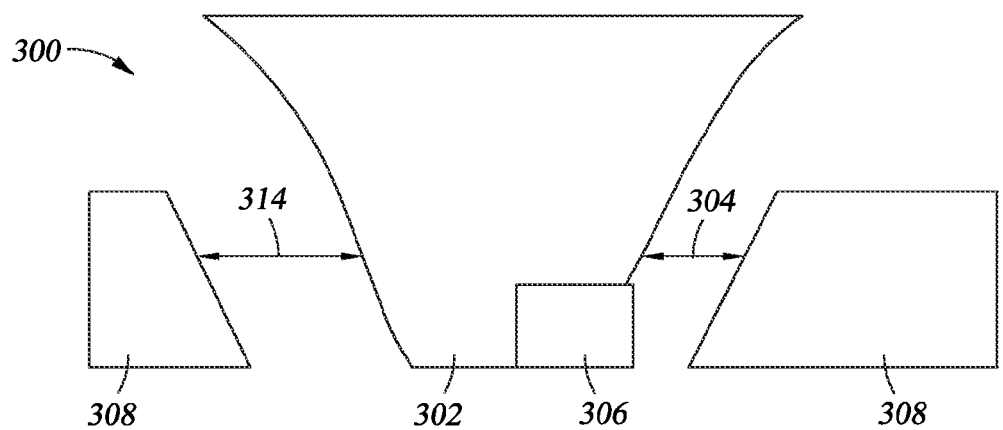

The MAMR-SMR head 500 is composed of a trailing shield 512, two side shields 508, a flare-shaped main pole 502 and an STO 506. The side gaps 504 and 514, which are defined as the distance from the edge of the main pole 502 to the side shields 508, are asymmetric when viewed from the MFS. The side gap 504 has a smaller width than the side gap 514, which helps to improve the magnetic field gradient in the cross-track direction and the magnetic field gradient in the down-track direction at the track edge. The side gap 504 is the narrower side gap because it is adjacent the STO 506. Because the STO 506 shares a first continuous edge with the main pole 502 on the side adjacent the narrow side gap 504 and a second continuous edge with the main pole 502 adjacent the MFS, accurate positioning of the STO 506 is easily achieved. Because the STO 506 and the main pole 502 share these two continuous edges, the side gap 504 does not need to be widened in order to insulate the side shield 308 and the STO 306, as required for the side gap 304 in FIG. 3. Side gap 504 can remain narrower than side gap 514, and the magnetic field gradient in the cross-track direction and the magnetic field gradient in the down-track direction at the track edge are improved.

Figure 6:
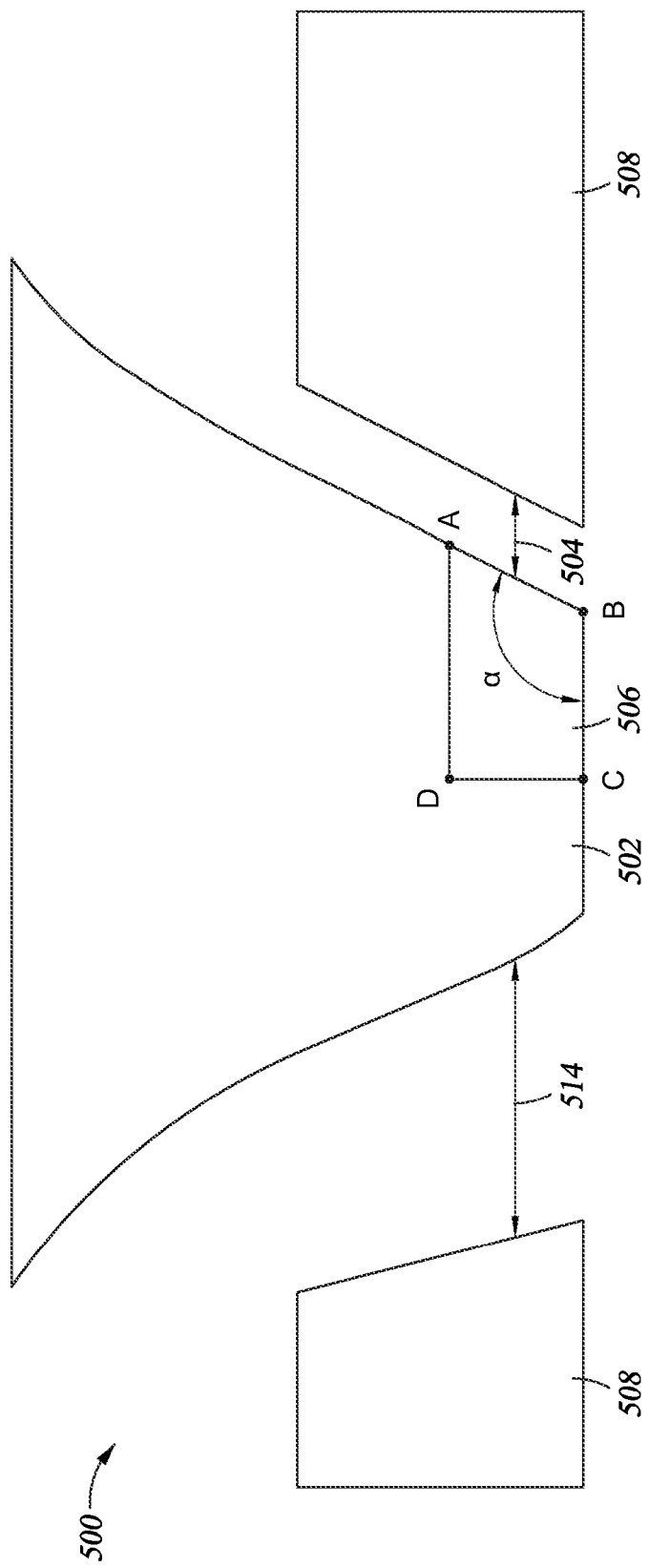
FIG. 6 illustrates a shingled-microwave-assisted magnetic head defining the angle α.

FIG. 6 shows one embodiment of the MAMR-SMR head 500 demonstrating an angle α between the contact surface of the main pole 502 and the STO 506. Here, the angle formed by the flare of the main pole 502 and the MFS at the contact surface of the main pole 502 and the STO 506, angle α, is greater than 90°. Angle α is defined as the angle between the line passing through the points A, B and the line passing through the points C, B, as shown in FIG. 6. The points A, B and C are three edges of the STO 506 and three edges of the main pole 502. Points C and B are positioned at the MFS, and points A and B are positioned on the side of the narrow side gap 504. Therefore, both the STO 506 and the main pole 502 have an angle α in common greater than 90°, as shown in the MAMR-SMR head 500 of FIG. 5 and FIG. 6.

In FIG. 6, the points A, B, C and D are on the four edges of the STO 506, where points B and C are positioned on the MFS, points A and B are positioned on the side of the narrow gap 504, and point D is on the main pole 502. The line passing through the points A, D is longer than the line passing through the points B, C. Additionally, the line passing through the points A, B is longer than the line passing through the points C, D. Therefore, the STO 506 is non-rectangular.

Figure 7A:
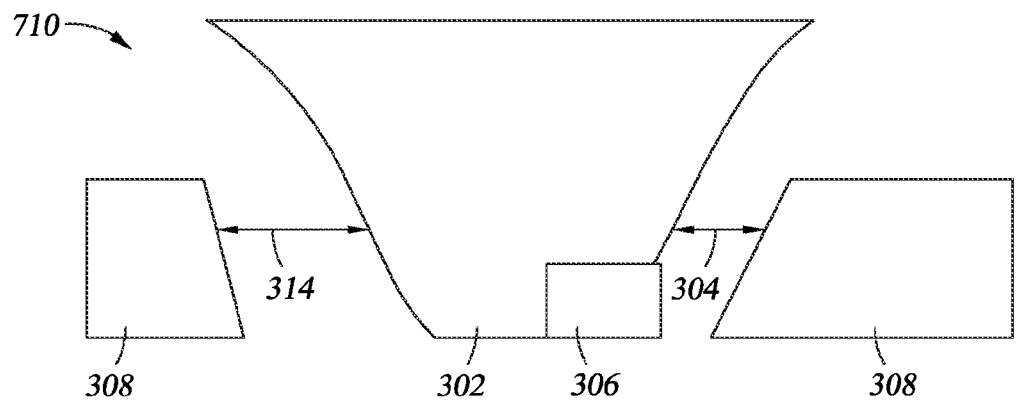
FIGS. 7A-7C illustrate and compare two magnetic head structures to one embodiment of the shingled-microwave-assisted magnetic recording head.
Figure 7B:
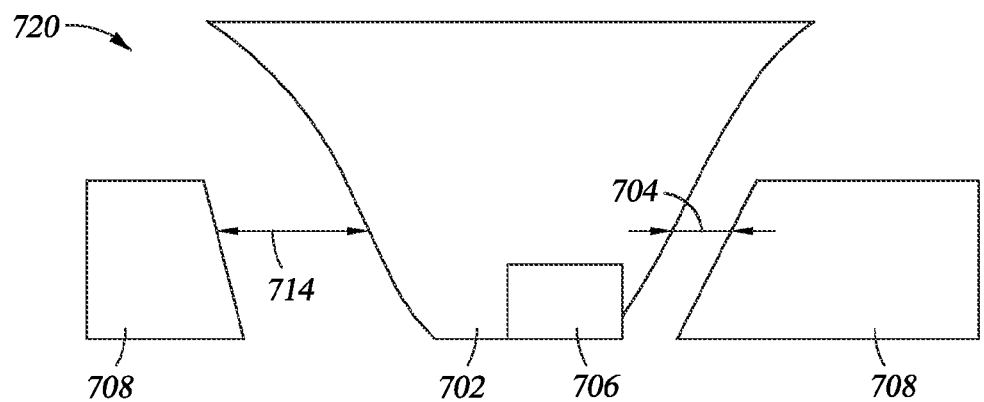
Figure 7C:
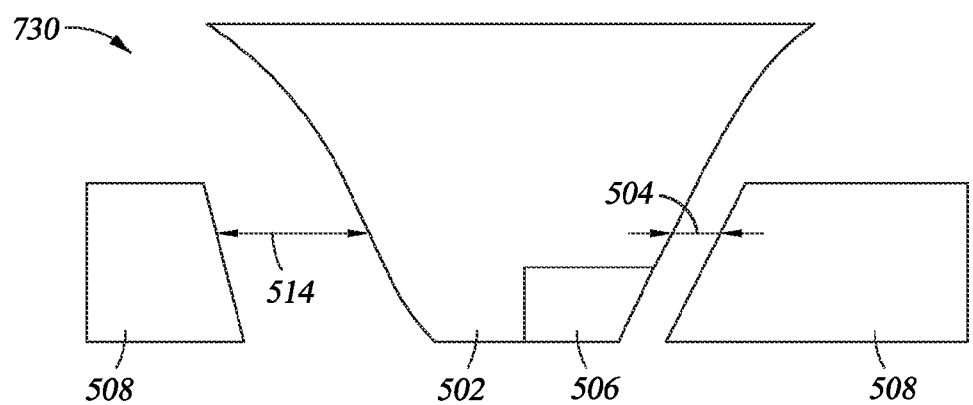

FIGS. 7A-7C and FIG. 8 show a comparison of three types of magnetic recording heads 710, 720 and 730. The writing and reading characteristics were evaluated for the three magnetic recording heads 710, 720 and 730 shown in FIGS. 7A-7C, where a higher SNR represents better writing and reading characteristics. FIG. 7A shows a magnetic recording head 710 with a writer structure having a rectangular STO 306. The 50 nm wide STO 306 is offset by 30 nm from the edge of the flare-shaped main pole 302 at the MFS, and has two side gaps, one side gap 304 with a smaller width than the other side gap 314. FIG. 7B shows a magnetic recording head 720 with a rectangular STO 706, and the 50 nm wide STO 706 is aligned at the edge of the flare-shaped main pole 702 at the MFS, and also has two side gaps, one side gap 704 with a smaller width than the other side gap 714. FIG. 7B also shows side shields 708. FIG. 7C shows one embodiment of a MAMR-SMR head 730 with a non-rectangular STO 506 aligned at the edge of the flare-shaped main pole 502 on the MFS and on the narrow gap side 504. The STO 506 has an angle greater than 90° on the edge of the flare-shaped main pole on the narrow gap side 504 and the MFS. The film thickness of each of the three STOs 306, 706, 506 is 25 nm and the height is 40 nm. The three magnetic recording heads 710, 720 and 730 may also have a trailing shield, though not shown in the figures.

Figure 8:
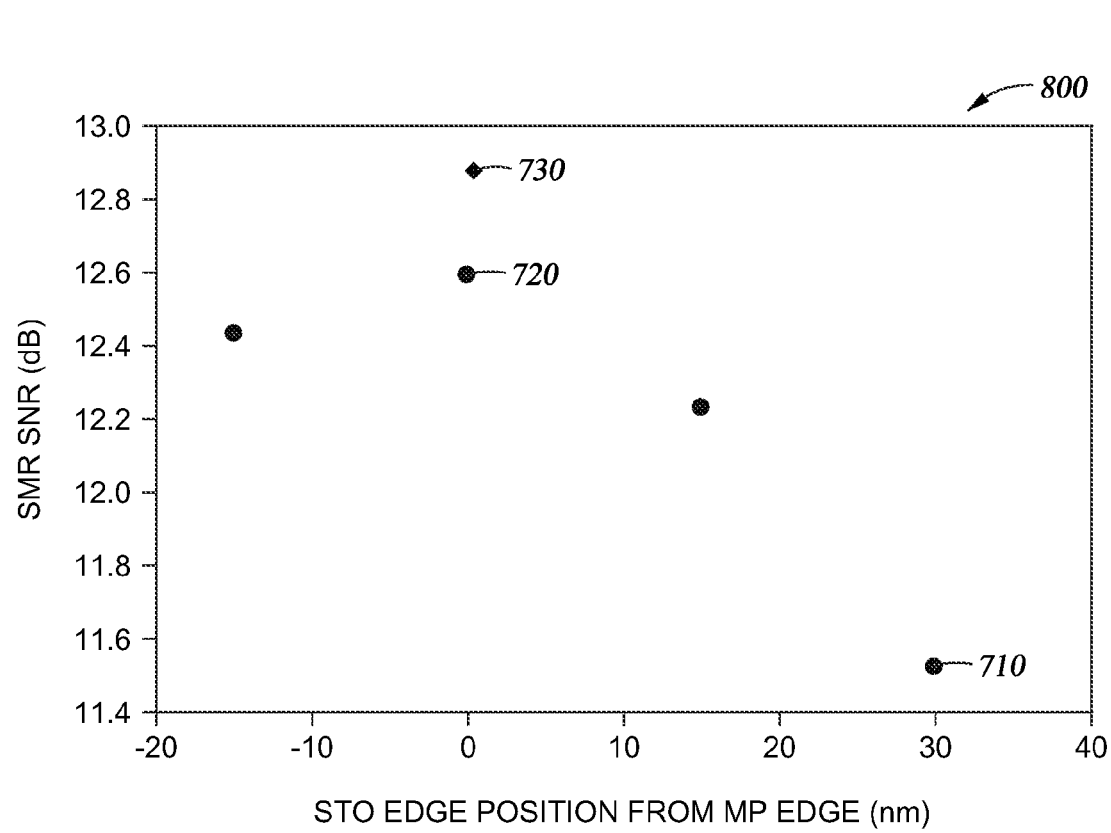
FIG. 8 is a graph showing the calculated SNR at a fixed track pitch for the three magnetic head structures of FIGS. 7A-7C.

FIG. 8 is a graph 800 showing the calculated SNR at a fixed track pitch when writing and reading by the SMR technique was performed for the three head structures 710, 720 and 730 of FIGS. 7A-7C. For all three magnetic head structures 710, 720 and 730, the fixed track pitch was 52 nm. The horizontal axis is the distance in nanometers between the edge of the STO 306, 506 and 706 and the edge of the main pole 302, 502 and 702, and the vertical axis is the SNR in decibels. The dot marks 710, 720 in the figure indicate the SNR in the SMR technique when the distance between the edge of the rectangular STO 306, 706 and the edge of the main pole 302, 702 was varied. In addition, the diamond shaped mark 730 indicates the proposed non-rectangular STO 506 structure. The MAMR-SMR head 730 had a SNR greater than about 12.8 dB, around 12.9 dB; the magnetic head 720 had a SNR of about 12.6 dB; the magnetic head 710 had a SNR less than 11.6 dB, around 11.5 dB.

Figure 4:
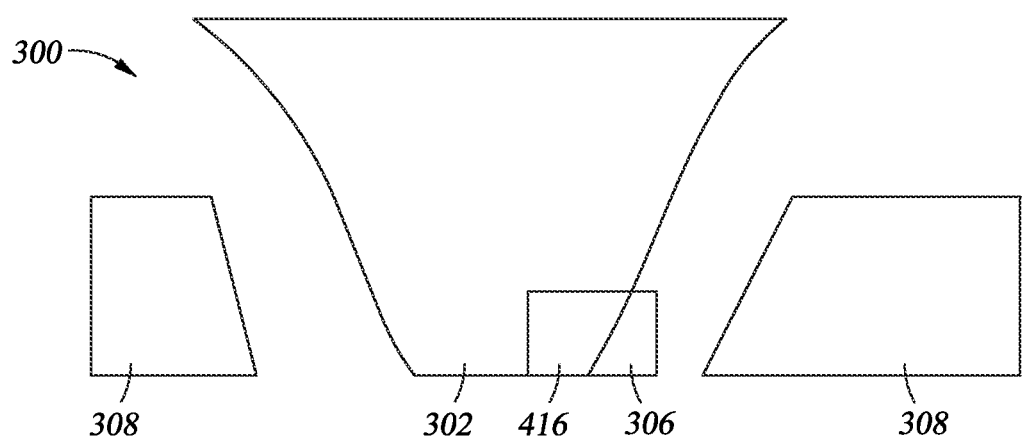
FIG. 4 illustrates the current conduction area of a spin torque oscillator and a main pole.

When the edge of the STO 306 is further towards the side shield 308 than the edge of the main pole 302, as shown in magnetic head 710 of FIG. 7A, an insulating layer is required between the end of the STO 306 protruding from the end of the main pole 302 and the side shield 308. An assumption of the SNR calculation analyzed in FIG. 8 was that a 20-nm insulating layer was required as the insulation between the side shield 308 and the STO 306. Normally in the SMR technique, the side gap 304 must be narrowed in order to improve the write magnetic field gradient at the track edge. When an insulation layer is required, the side gap 304 is defined by the sum of the insulating layer and the protruding STO 306. Therefore, when the edge of the STO 306 protrudes further out than the edge of the main pole 302, like in FIG. 7A, the SNR degrades, as can be seen in FIG. 8. This is believed to occur because as the side gap 304 widens, the cross-track magnetic field gradient degrades. When the AC magnetic field strength is examined, the conduction area in the magnetic recording head 710 of FIG. 7A becomes smaller, like shown in FIG. 4, and the AC magnetic field strength generated from the STO 306 decreases. Therefore, the MAMR-SMR head 730 is able to obtain a larger cross-track magnetic field gradient and AC magnetic field strength than the magnetic head 710. FIG. 8 also shows the MAMR-SMR head 730 having a higher SNR than the magnetic recording heads 710 and 720.

In addition, when the magnetic recording heads 720 and 730 of FIG. 7B and FIG. 7C are compared, the MAMR-SMR head 730 of FIG. 7C is able to obtain a larger AC magnetic field strength because the conduction region is wider. The MAMR-SMR head 730 also has a higher cross track field gradient than magnetic head 720. For the MAMR-SMR head 730, the volume of the STO 506 for more stable AC magnetic field generation is larger than in the magnetic recording head 720 of FIG. 7B. Accurate positioning of the STO 706 is also difficult to achieve with magnetic head 720, unlike with the STO 506 of the MAMR-SMR head 730.

In the STO, the area for conduction must be expanded to increase the AC magnetic field strength generated in order to stabilize the oscillation. Therefore, the preferred angle α is greater than 90°, making the STO 506 non-rectangular as shown in FIG. 6 and FIG. 7C. In addition, when the STO 706 edge is further inside than the edge of the main pole 702, like in FIG. 7B, the SNR degrades because the optimal AC magnetic field strength cannot be achieved in the center of the track pitch. In the MAMR-SMR head 730 of FIG. 7C, by aligning the STO 506 edge and the main pole 502 edge, a high cross-track gradient and a larger AC magnetic field caused by the STO 506 can be used in the SMR technique, and therefore, the SNR at the center of the track pitch can be greatly improved.

Figure 9:
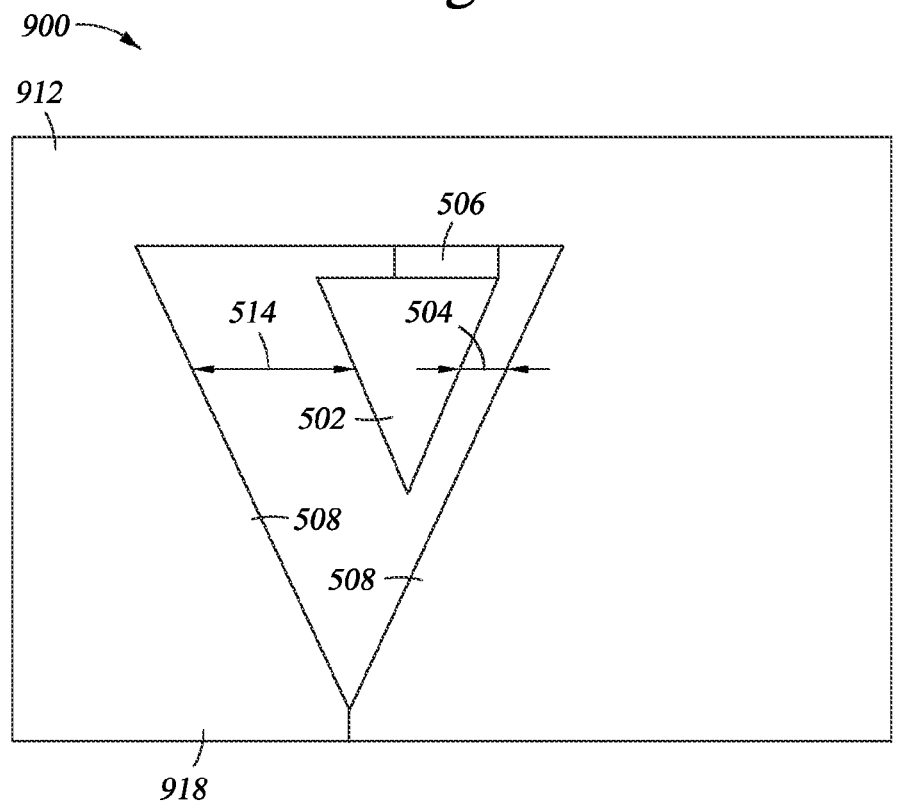
FIG. 9 illustrates shingled-microwave-assisted magnetic recording head with a leading shield, according to one embodiment.

In the flare-shaped main pole 502, the desired effects were confirmed in the range when the angle α was greater than 90°. In addition, the proposed structure was effective for several other MAMR-SMR head embodiments. FIG. 9 illustrates one such embodiment where the desired effects were obtained. The MAMR-SMR head 900 has a leading shield 918 and a flare-shaped main pole 502. In this embodiment, the leading shield 918 is coupled to the two side shields 508 and the trailing shield 912, completely surrounding the main pole 502 and non-rectangular STO 506. One side gap 504 has a smaller width than the other side gap 514, and the MAMR-SMR head 900 is able to obtain a larger cross-track magnetic field gradient and AC magnetic field strength.

Figure 10:
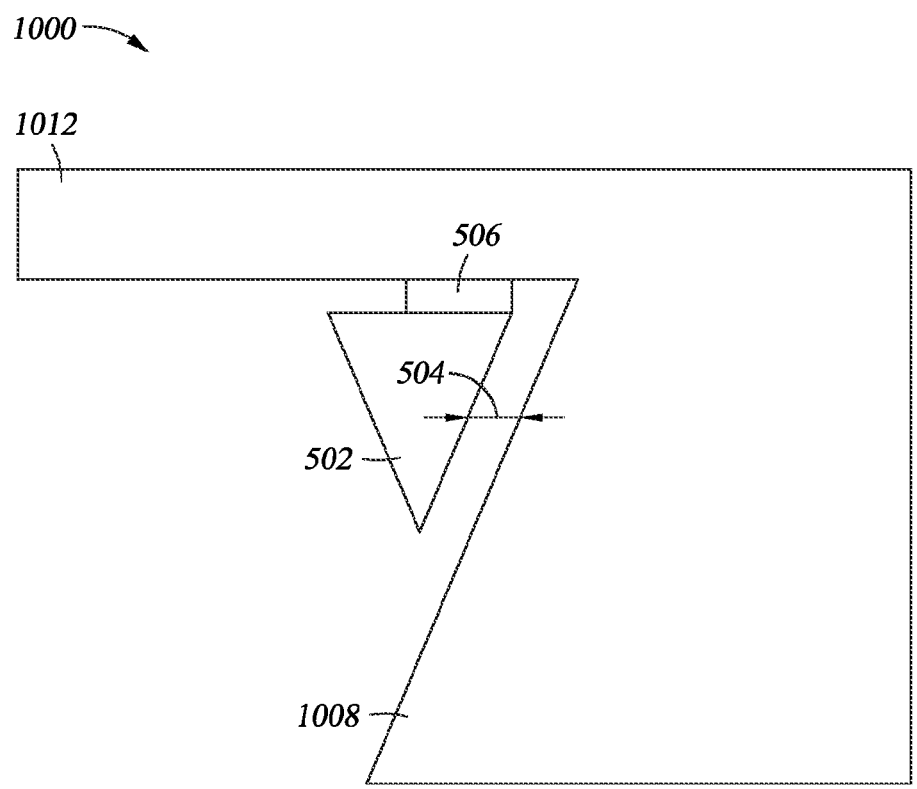
FIG. 10 illustrates the shingled-microwave-assisted magnetic recording head with asymmetric side shields, according to one embodiment.

FIG. 10 illustrates another embodiment where the desired effects were obtained. The MAMR-SMR head 1000 has only one side shield 1008, which is coupled to the trailing shield 1012. In MAMR-SMR head 1000, there is only one side gap 504, which is adjacent the non-rectangular STO 506 and the flare-shaped main pole 502. Even with only one side shield 1008 and one narrow side gap 504, the MAMR-SMR head 1000 is able to obtain a larger cross-track magnetic field gradient and AC magnetic field strength.

Figure 11:
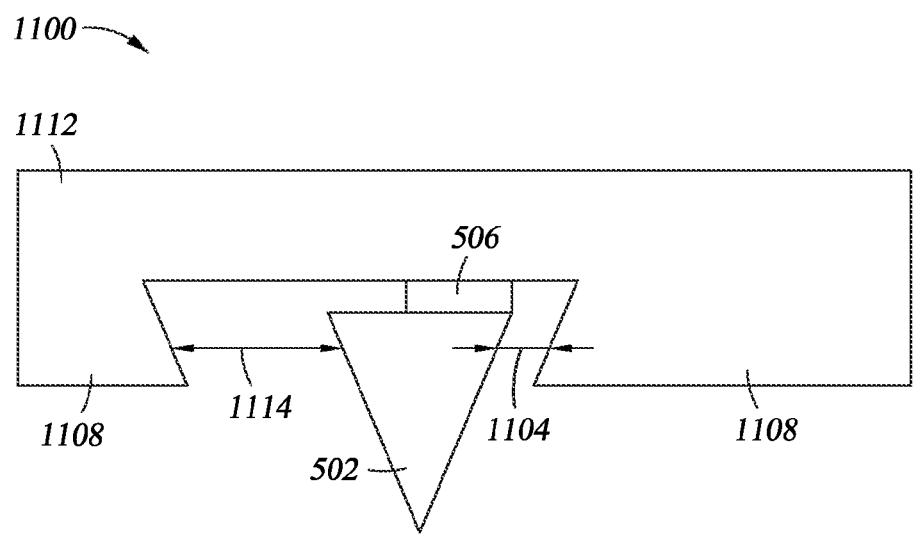
FIG. 11 illustrates the shingled-microwave-assisted magnetic recording head with short side shields, according to one embodiment.

FIG. 11 illustrates another effective embodiment where the MAMR-SMR head 1100 has two short side shields 1108. In this embodiment, the flare-shaped main pole 502 has a length longer than both side shields 1108 when viewed from the MFS. The side shields 1108 are coupled to the trailing shield 1112 and are long enough to extend past the non-rectangular STO 506. The side gaps 1104 and 1114 are comparable in width to side gaps 504 and 514 of FIG. 5, respectively, where side gap 1104 is adjacent the STO 506 and has a smaller width than side gap 1114. With two short side shields 1108, the MAMR-SMR head 1100 is able to obtain a larger cross-track magnetic field gradient and AC magnetic field strength.

Figure 12:
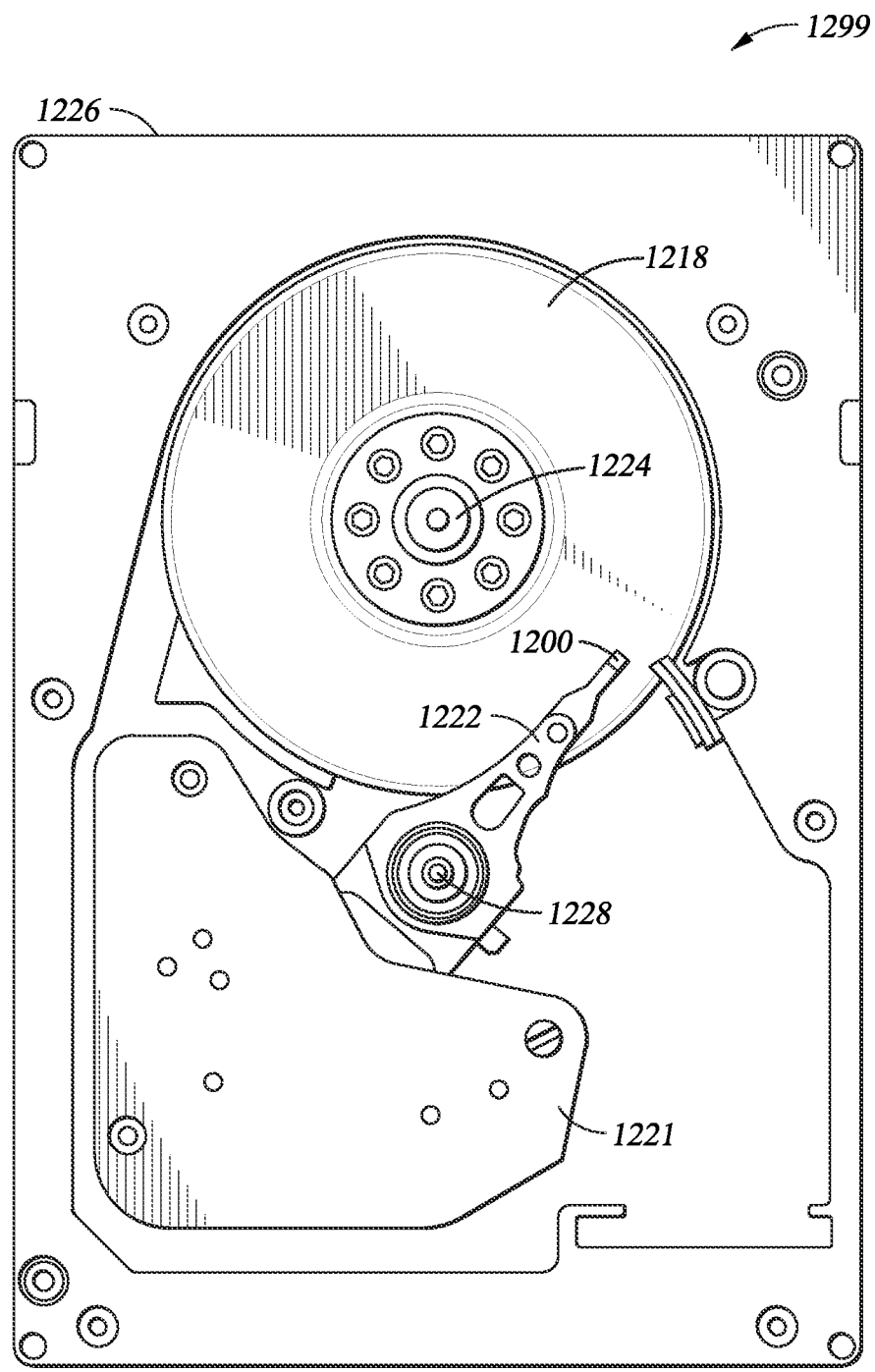
FIG. 12 illustrates a top view of an exemplary hard disk drive.

FIG. 12 illustrates a top view of an exemplary HDD 1299, according to an embodiment of the invention. As illustrated, HDD 1299 may include one or more magnetic disks 1218, actuator 1221, actuator arms 1222 associated with each of the magnetic disks, and spindle motor 1224 affixed in a chassis 1226. The one or more magnetic disks 1218 may be arranged vertically as illustrated in FIG. 12. Moreover, the one or more magnetic disks may be coupled with the spindle motor 1224.

Magnetic disks 1218 may include circular tracks of data on both the top and bottom surfaces of the disk. A magnetic head 1200 mounted on a slider may be positioned on a track. As each disk spins, data may be written on and/or read from the data track. Magnetic head 1200 may be coupled to an actuator arm 1222 as illustrated in FIG. 12. Actuator arm 1222 may be configured to swivel around actuator axis 1228 to place magnetic head 1200 on a particular data track. Magnetic head 1200 could be any MAMR-SMR head 500, 730, 900, 1000, 1100 discussed in the previous embodiments above.

A high-areal-density HDD is implemented by SMR using MAMR to provide a perpendicular magnetic write head structure having a high SNR. In particular, in a narrow track HDD, the maximum MAMR assist effect must be implemented at the track edge in order to achieve a high SNR, and the cross track gradient and down track gradient at the track edge must be increased. The features of the MAMR-SMR head are that the side gaps stipulated at a distance between the main pole end and the side shields differ on the left and right sides of the main pole; and the shape of the STO end on the side of the narrow side gap and the flare shape of the main pole are similar in the contact plane of the main pole and the STO. The angle α formed by the main pole flare and the MFS is greater than 90° at the contact surface of the main pole and the STO.

While the foregoing is directed to embodiments of the present invention, other and further embodiments of the invention may be devised without departing from the basic scope thereof, and the scope thereof is determined by the claims that follow.

What is claimed is:

1. A shingled-microwave-assisted magnetic recording head, the magnetic recording head comprising:
    a main pole;
    two side shields adjacent to the main pole;
    a trailing shield coupled to the two side shields, wherein two asymmetric side gaps are present on either side of the main pole between the two side shields, wherein the gaps are filled with nonmagnetic material and wherein one side gap has a smaller width than another side gap; and
    a spin torque oscillator disposed off-centered on an edge adjacent a media facing surface on the main pole such that the spin torque oscillator is only disposed on a portion of the edge of the main pole adjacent the media facing surface, wherein the spin torque oscillator shares a first continuous edge with the main pole on a side adjacent the side gap having the smaller width and shares a second continuous edge adjacent the media facing surface.

2. The magnetic recording head of claim 1, wherein the first continuous edge and the second continuous edge form an angle greater than 90°.

3. The magnetic recording head of claim 1, wherein a signal-to-noise ratio is greater than 12.8 dB.

4. The magnetic recording head of claim 1, wherein the two side shields are coupled to a leading shield.

5. The magnetic recording head of claim 1, wherein the two side shields are shorter in length than the main pole when viewed from the media facing surface.

6. The magnetic recording head of claim 1, wherein the spin torque oscillator is non-rectangular.

7. The magnetic recording head of claim 6, wherein a side of the spin torque oscillator adjacent the media facing surface has a width less than a side of the spin torque oscillator opposite the media facing surface.

8. The magnetic recording head of claim 1, wherein the main pole is flare shaped.

9. The magnetic recording head of claim 1, wherein the film thickness of the spin torque oscillator is about 25 nanometers.

10. The magnetic recording head of claim 1, wherein the height of the spin torque oscillator is about 40 nanometers.

11. A magnetic media device, comprising:
    a shingled-microwave-assisted magnetic recording head, the magnetic recording head comprising:
    a main pole;
    a trailing shield;
    first and second side shields adjacent the main pole, wherein a narrow side gap is disposed on one side of the shingled-microwave-assisted magnetic recording head between the first side shield and the main pole, and a wide side gap is disposed on the other side of the shingled-microwave-assisted magnetic recording head between another the second side shield and the main pole; and
    a spin torque oscillator disposed off-centered on an edge adjacent a media facing surface on the main pole such that the spin torque oscillator is only disposed on a portion of the edge of the main pole adjacent the media facing surface, wherein the spin torque oscillator shares a first continuous edge with the main pole on a side adjacent the narrow side gap and shares a second continuous edge adjacent the media facing surface.

12. The magnetic media device of claim 11, wherein the first continuous edge and the second continuous edge form an angle greater than 90°.

13. The magnetic media device of claim 11, wherein a signal-to-noise ratio is greater than 12.8 dB.

14. The magnetic media device of claim 11, wherein each side shield is longer than the main pole when viewed from the media facing surface.

15. The magnetic media device of claim 11, wherein the spin torque oscillator is non-rectangular.

16. The magnetic media device of claim 15, wherein a side of the spin torque oscillator adjacent the media facing surface has a width less than a side of the spin torque oscillator opposite the media facing surface.

17. A hard disk drive, comprising:
    one or more magnetic disks;
    an actuator;
    one or more actuator arms associated with each of the one or more magnetic disks;
    a spindle motor;
    a shingled-microwave-assisted magnetic recording head, the magnetic recording head comprising:
    a main pole;
    two side shields adjacent to the main pole;
    a trailing shield coupled to the two side shields, wherein two asymmetric side gaps are disposed on either side of the main pole between the two side shields, wherein one side gap has a smaller width than the other side gap; and
    a non-rectangular spin torque oscillator disposed off-centered on an edge adjacent a media facing surface on the main pole such that the spin torque oscillator is only disposed on a portion of the edge of the main pole adjacent the media facing surface, wherein the spin torque oscillator shares a first continuous edge with the main pole on a side adjacent the side gap having the smaller width and shares a second continuous edge adjacent the media facing surface.

18. The hard disk drive of claim 17, wherein the first continuous edge and the second continuous edge form an angle greater than 90°.

19. The hard disk drive of claim 17, wherein a side of the spin torque oscillator adjacent the media facing surface has a width less than a side of the spin torque oscillator opposite the media facing surface.

20. The hard disk drive of claim 17, wherein a signal-to-noise ratio is greater than 12.8 dB.

* * * * *